United States Patent [19]

Richards

[11] Patent Number: 4,890,954
[45] Date of Patent: Jan. 2, 1990

[54] JOINT CONSTRUCTION AND MOUNTING STRUCTURE

[75] Inventor: Peter S. Richards, Issaquah, Wash.

[73] Assignee: Progressive Fastening, Inc., Seattle, Wash.

[21] Appl. No.: 234,700

[22] Filed: Aug. 22, 1988

Related U.S. Application Data

[63] Continuation-in-part of Ser. No. 47,439, May 6, 1987, Pat. No. 4,802,785, which is a continuation-in-part of Ser. No. 811,939, Dec. 20, 1985, Pat. No. 4,667,916.

[51] Int. Cl.[4] .................................................. B25G 3/00
[52] U.S. Cl. ..................................... 403/260; 403/370; 403/372; 248/343
[58] Field of Search .................. 248/317, 74.1, 59, 70, 248/342–344; 16/39; 403/372, 260, 370, 245, 27; 411/103, 111, 112

[56] References Cited

U.S. PATENT DOCUMENTS

| | | | |
|---|---|---|---|
| 1,031,462 | 7/1912 | Paine . | |
| 1,736,722 | 11/1929 | Newman . | |
| 1,753,183 | 4/1930 | Johnson . | |
| 1,768,505 | 6/1939 | Carr ............................... | 16/39 |
| 2,190,555 | 2/1940 | Toce et al. ..................... | 287/20 |
| 2,281,279 | 4/1942 | Fox ................................ | 67/23 |
| 2,730,419 | 1/1956 | Walrous et al. ................ | 248/188 |
| 2,798,748 | 7/1957 | Maurer ........................... | 287/52 |
| 2,922,455 | 1/1960 | Braendel ........................ | 151/41.7 |
| 2,950,937 | 8/1960 | Bedford, Jr. ................... | 287/126 |
| 2,972,495 | 2/1961 | Yalen ............................. | 287/54 |
| 3,009,747 | 11/1961 | Pitzer ............................. | 308/71 |
| 3,135,033 | 6/1964 | Jackson .......................... | 24/122.3 |
| 3,271,056 | 9/1966 | Frisbey, Jr. .................... | 287/20.92 |
| 3,355,201 | 11/1967 | Barwick ......................... | 287/119 |
| 3,506,227 | 4/1970 | Jenkins ........................... | 248/59 |
| 3,633,862 | 1/1972 | Breen ............................. | 248/251 |
| 3,779,659 | 12/1973 | Habert ........................... | 403/372 |
| 4,033,222 | 7/1977 | Wilson ........................... | 411/33 |
| 4,134,703 | 1/1979 | Hinners ......................... | 403/104 |
| 4,147,458 | 4/1979 | Elders ............................ | 411/33 |
| 4,573,652 | 3/1986 | Richards ........................ | 248/74.1 |
| 4,667,916 | 5/1987 | Richards ........................ | 403/260 X |
| 4,802,785 | 2/1989 | Richards ........................ | 403/260 X |

FOREIGN PATENT DOCUMENTS

| | | | |
|---|---|---|---|
| 483979 | 6/1952 | Canada .......................... | 411/33 |
| 668912 | 4/1950 | United Kingdom . | |
| 2061365 | 4/1950 | United Kingdom ............ | 411/33 |

Primary Examiner—Andrew V. Kundrat
Attorney, Agent, or Firm—Delbert J. Barnard; Glenn D. Bellamy

[57] ABSTRACT

A flat member (22) is attached to a lower end of a support leg (14) so that it extends horizontally from the support leg (14). An expansion clamp assembly (24) is carried by the member (22). This assembly (24) is plugged into the tubular lower end portion (26) of the support leg (14). Wing portions (58) of a nut wing washer (50) are deflected by the insertion of the assembly (24) into the tubular portion (26), and the wings (58) are biased into a tight gripping contact with the inner tubular portion (26). This secures the nut wing washer (50) and a nut (46) against rotation. Then, the member (22) is rotated, relative to the support leg (14), causing a relative endwise movement of a stud (28) carried by the member (22) into the nut (46). This movement causes cam surfaces (40, 40') on a cam ring (36) to be moved against angled wings (66, 66') of the upper and lower locking washers (44, 44'), in a direction which deflects the wings outwardly, and moves the edges (70, 70') on the wings (66, 66') into a tight metal-displacing engagement with the inner wall of the socket (26). Rotation of the member (22) is continued until the member (22) is securely fastened to the support leg (14). The lower locking washer (44') holds the assembly (24) upwardly into the tubular end portion (26) as the upper locking washers (44) are expanded. A conical brace member (80) may be provided at the upper end of the support leg (14) and is preloaded in compression.

16 Claims, 2 Drawing Sheets

U.S. Patent  Jan. 2, 1990  Sheet 1 of 2  4,890,954
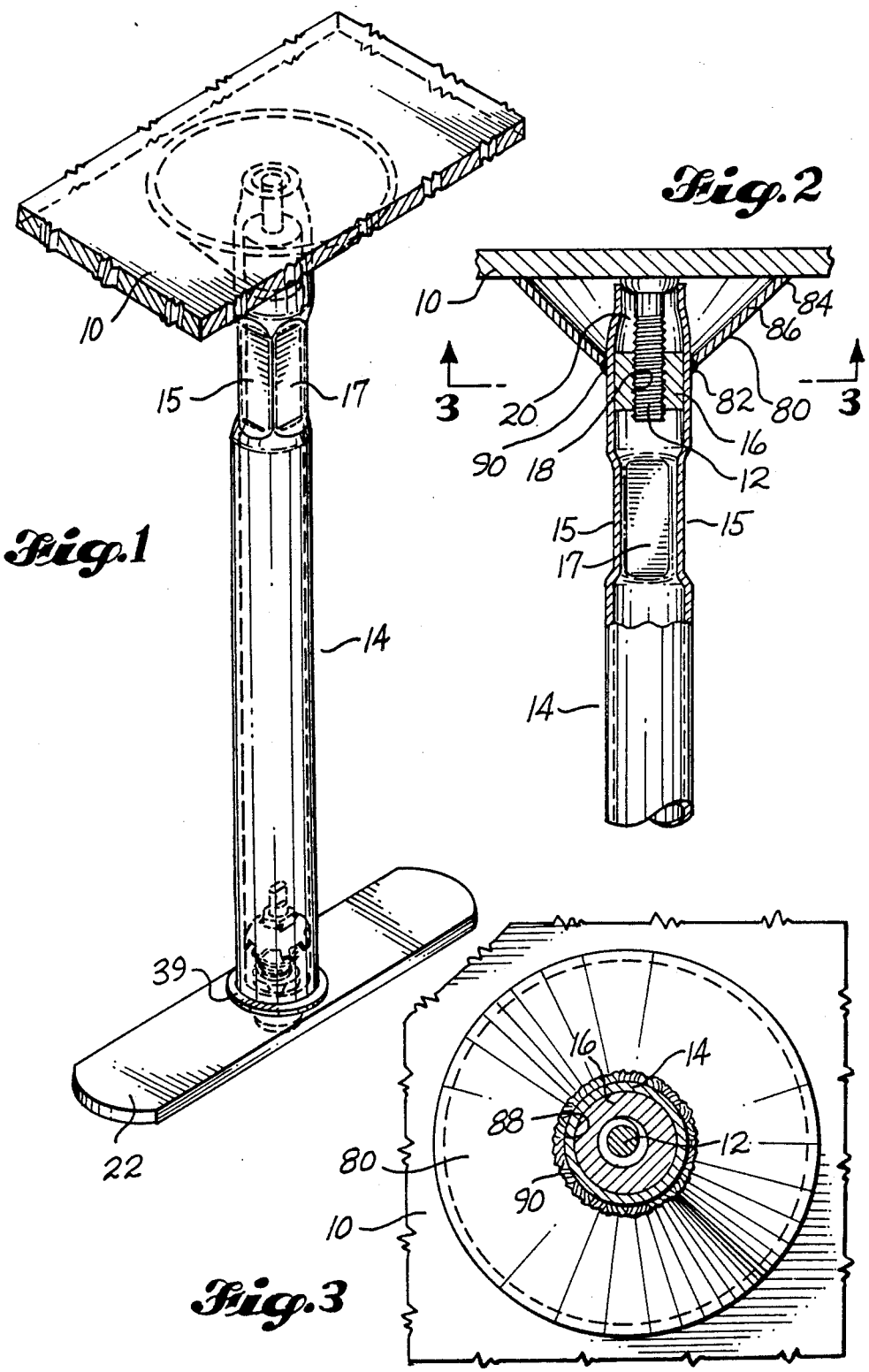

U.S. Patent    Jan. 2, 1990    Sheet 2 of 2    4,890,954
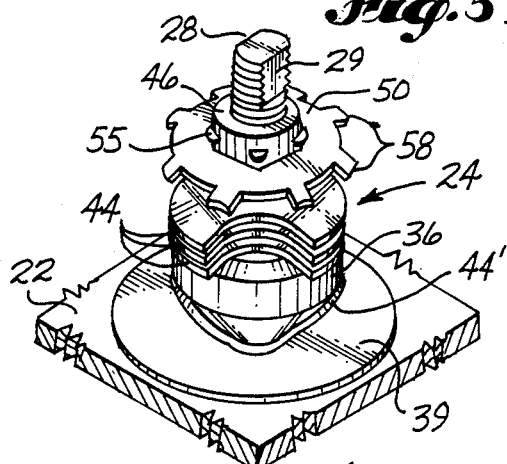
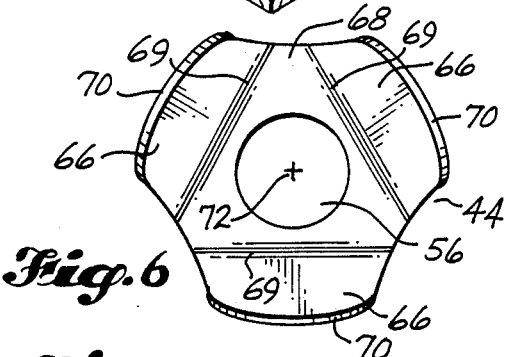
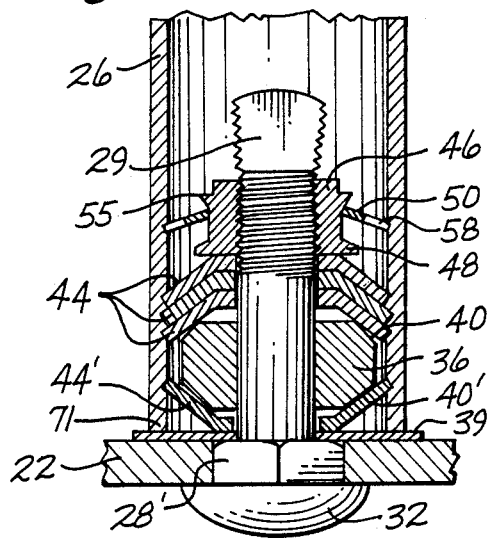
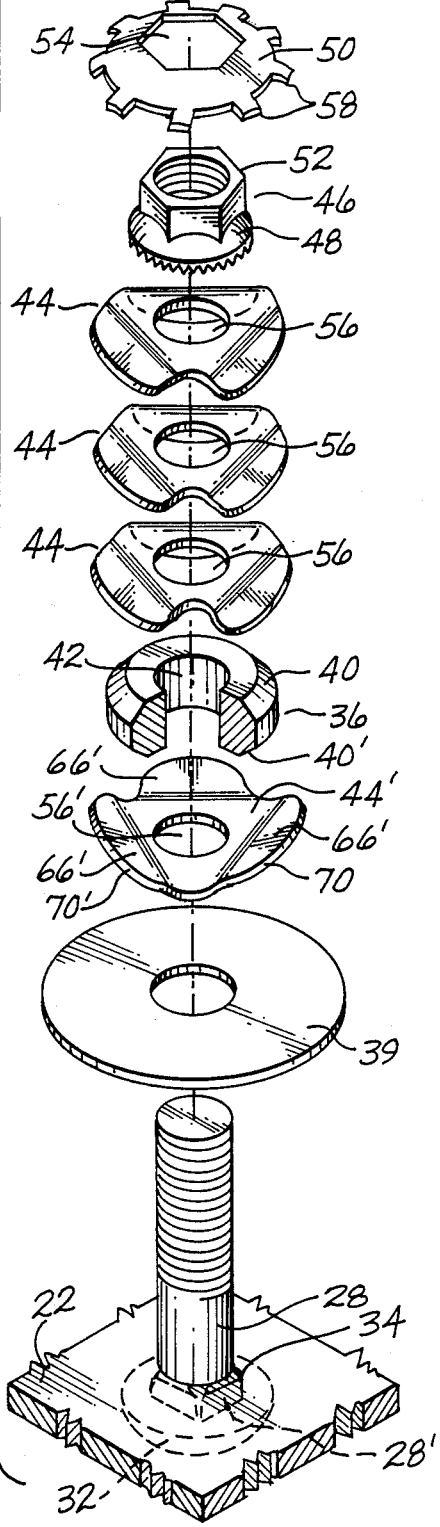

JOINT CONSTRUCTION AND MOUNTING STRUCTURE

RELATED APPLICATION

This is a continuation-in-part of my copending application Ser. No. 07/047,439, filed May 6, 1987, now U.S. Pat. No. 4,802,785 and entitled "Joint Construction and Overhead Hanger", which is a continuation-in-part of application Ser. No. 811,939, filed Dec. 20, 1985, now U.S. Pat. No. 4,667,916, which issued May 26, 1987, entitled "Overhead Hanger and Joint Construction."

TECHNICAL FIELD

This invention relates to a joint construction between two members, a first of which includes a socket, and in particular to a joint construction including an expansion connector assembly carried by the second member that is merely plugged into the socket and then rotated, to provide a strong and firm connection between the two members.

BACKGROUND ART

The general concept of an expansion connector is old. This type of connector comprises a first part which is in the nature of an insert and a second part which includes a socket for the insert. The insert is inserted into the socket and expanded to exert a clamping or holding force on the wall of the socket.

Examples of expansion connectors which can be found in the patent literature are shown by the following U.S. Pat.: Nos. 2,190,555, granted Feb. 13, 1940, to Charles A. Toce, Robert F. Broussard and William N. Woodruff; 2,281,279, granted Apr. 28, 1942, to David A. Fox; 2,798,748, granted July 9, 1957, to Albrecht Maurer; 3,009,747, granted Nov. 21, 1961, to Kenneth H. Pitzer; 3,135,033, granted June 2, 1964, to Samuel H. Jackson; 3,355,201, granted Nov. 28, 1967 to Leroy E. Barwick; 3,779,659, granted Dec. 18, 1973 to Roger Habert; and 4,134,703, granted Jan. 16, 1979, to Earl S. Hinners. Other expansion connectors are disclosed by my U.S. Pat. Nos. 4,667,916 and 4,691,889.

The mechanisms disclosed by these patents should be carefully considered for the purpose of putting the present invention into proper perspective relative to the prior art.

The present invention relates to the provision of a new and unique joint construction comprising a first member which includes an expansion insert. The insert is merely slipped endwise into a socket carried by the second member, and then one of the members is simply rotated relative to the other, and the insert functions to dig into the wall of the socket and in that manner securely connect the two members together.

Another object of the invention is to provide an improved mounting structure for a suspended object (e.g. a lighting fixture) which utilizes the joint construction, and which makes it possible for the user to disassemble and then later reassemble the mounting structure, without the use of destructive methods (e.g. removing parts by use of metal cutting equipment).

Ship construction is done in stages. Quite often, a component is installed and then it is discovered that the component must be removed in order to either install another component, or perform some other stage of the construction of the ship. Light fixtures must be securely affixed to the ceiling structure and this has in the past been done by welding the upper ends of support leg members to the ceiling and welding cross members to the lower ends of the support leg members, and then bolting the light fixtures to the cross members. When a mounting structure was installed in this way it became necessary to remove it in a destructive manner, such as by use of a cutting torch. The mounting structure of the present invention provides a way of easily connecting and disconnecting the parts of the mounting structure to each other and to the ceiling structure, so that if it becomes necessary to remove the mounting structure, it can be done without destructive affects to this component, so that such component can be reused. The mounting structure of the present invention makes it easy to raise or lower a lighting fixture or similar object. The mounting structure need only be disassembled and then reassembled with a longer or shorter support leg.

DISCLOSURE OF THE INVENTION

In basic form the joint construction of the present invention comprises a first member which includes a cylindrical sidewall defining a socket having an inner surface, and a second member which includes a connector assembly that plugs into the socket. The connector assembly comprises a fixed in position threaded stud having a base and a free end. A lower locking disk is provided at the base of the stud. The lower locking disk includes a central opening through which the stud extends, and a plurality of wings spaced around the disk and formed to extend away from the base of the stud. A cam ring is provided having a central opening through which the stud extends and having upper and lower outer beveled edges at opposite ends. The cam ring is smaller in diameter than the inside diameter of the socket. At least one upper locking disk is located on the stud. Each upper locking disk includes a central opening through which the stud extends, and a plurality of wings spaced around the disk and formed toward the upper beveled edge of the cam ring. The wings have outer grip edges. Each locking disk is sized to slip fit into the socket. A nut is threaded onto the stud, outwardly of the upper locking disk(s). The nut may include a flange at its end nearest the cam ring and a wrench portion extending from said flange in a direction opposite the cam ring. A nut wing washer is secured to the nut. The nut wing washer has a central opening corresponding in shape to the wrench portion on the nut in which the wrench portion of the nut is received. Means are provided for holding the nut wing washer against axial movement off from the nut. The nut wing washer has a plurality of wings which are bent to extend toward the cam ring. The wings have grip edges at their outer ends. It also has a plan form that is larger than the inside diameter of said socket.

The two members are easily and quickly connected together by a slip-in movement of the connector assembly on the second member into the tubular socket of the first member. This slip-in movement causes a bending of the wings of the nut wing washer, attended by the edges of such wings gripping the inner surface of the socket. Next, one of the members is rotated relative to the other. The grip of the edges of the wings of the nut wing washer holds the nut wing washer against rotation relative to the socket. The nut wing washer is secured against rotation to the nut, and so the nut also is held in position relative to the first member during the rotation. As a result, there is an axial travel of the nut on the stud toward the cam ring. Such axial travel causes the beveled edges of the cam ring to push the wings of the upper and lower lock disks outwardly, so as to press their edges into tight galling engagement with the inner surface of the socket.

In accordance with another aspect of the invention, a joint construction of the type described above is provided at the lower end of a support leg. The connector assembly is a part of a frame member which is connected to the lower end of the support leg. The upper end of the support leg is connected to an overhead structure, such as a ceiling, or the like. In preferred form, this mounting structure is used for suspending an object from the overhead of the ship. The upper end of the support leg is secured to a portion of the ceiling and the frame member is attached to the lower end of the support leg, in the manner described above.

Other more detailed features of the invention are described below in connection with the description of the illustrated embodiments.

BRIEF DESCRIPTION OF THE DRAWINGS

Like reference numerals are used to designate like parts throughout the several views of the drawings, and:

FIG. 1 is an isometric view of a mounting structure constituting a preferred embodiment of the invention;

FIG. 2 is a fragmentary view of a detachable threaded connection at the upper end of a support leg and a plate which is welded or otherwise secured to a ceiling structure or the like, or is the ceiling;

FIG. 3 is a sectional view taken substantially along line 3—3 of FIG. 2;

FIG. 4 is a pictorial view of the connector assembly in an assembled condition;

FIG. 5 is an exploded pictorial view of the connector assembly;

FIG. 6 is a top plan view of a locking disk; and

FIG. 7 is a fragmentary sectional view at the lower end of a support leg, showing a section of a frame member attached thereto, with the connector assembly engaged within the socket of the support leg.

BEST MODE FOR CARRYING OUT THE INVENTION

FIGS. 1–7 illustrate a preferred form of overhead support member and a preferred form of joint construction.

Referring to FIG. 1, member 10 is an overhead structure.

Member 10 includes a downwardly extending threaded stud 12 (FIG. 2).

In preferred form, a mounting leg 14 includes an insert member 16 at its upper end. Member 16 includes a threaded axial opening 18. The upper end portion of support leg 14 may be swaged about the insert 16, for firmly gripping the diameter interior opening 20 through which the insert 16 cannot pass in the upward direction. The portion of support leg 14 below insert 16 is preferrably swaged to provide a cross section which includes at least one pair of opposed wrench flats 15. The illustrated example includes a second pair of wrench flats 17. A reduced diameter section below the insert 16 prevents downward movement of insert 16.

In preferred form, a flat rectangular bar 22 is provided at the lower end of support leg 14. Bar 22 carries a connector assembly 24 which can be easily moved endwise into the tubular lower end portion 26 of the support leg 14.

As shown in FIGS. 4, 5 and 7, the connector assembly 24 comprises a stud 28 having a base end 30 which is shown connected to the member 22. Specifically, the stud 28 is in the form of a bolt having a head 32 at its lower end. The square shank base of the bolt 28' extends through a square opening 34 formed in member 22.

At the base end of the stud 28 is a lower locking disk 44'. The lower locking disk 44' has a circular opening 56' at its center through which the stud 28 extends. A washer 39, sized larger than the diameter of the tubular portion 26 of the support leg 14, may be provided between the lower locking disk 44 and the upper surface of member 22.

A cam ring 36 is provided upwardly of the lower locking disk 44'. The stud 28 extends upwardly through a central opening 42 in the cam ring 36. Opposite outward edges 40, 40' are beveled, as illustrated. These upper and lower edges 40, 40' constitute cam surfaces, the function of which will hereinafter be described.

In accordance with the invention, one or more upper locking disks 44 are stacked on the stud 28. Three such upper locking discs 44 are shown in FIGS. 4, 5 and 7. A nut 46 is provided above the upper locking disk(s) 44. Nut 46 includes a flange 48 at its lower end, down onto which the central portion of a nut wing washer 50 sits. The illustrated nut 46 has a wrench flat portion 52 of conventional hexagonal form. The nut wing washer 50 includes a central opening 54 which is sized to snugly receive the hexagonal wrench flat portion 42. When the nut wing washer 50 is installed, there is an engagement between the wrench flats on portion 52 on nut 46 and the edge surfaces of the opening 52 which prevents the nut wing washer 50 from rotating relative to the nut 46. As earlier stated, the nut wing washer 50 sits down on the flange 48 and such flange 48 prevents it from moving axially in the downward direction. In preferred form, upper corner portions of the nut 46 are deformed to form projections 55 which serve to prevent the nut wing washer 50 from moving off the nut in the direction away from flange 48.

The lock disks 44, 44' have circular openings 56, 56' at their centers through which the threaded shank portion of the stud 28 extends.

The nut wing washer 50 and the locking disks 44, 44' have winged portions which are bent at an angle to a flat central portion. The winged portions 66' of the lower locking disk 44' are bent upwardly at an angle away from member 22. Winged portions 66 of the upper locking disks 44 and wings 58 of the nut wing washer 50 are bent downwardly toward member 22. In this manner, winged portions 66, 66' of the locking disks 44, 44' are angled toward the cam ring 36 which is situated therebetween.

The outer edges of the wings 58 may be cut to each comprise a point on each side and a concave region between the points, as illustrated. This nut wing washer 50 is slightly larger in diameter than the inside diameter of the tubular end portion 26 of member 14.

The nut wing washer 50 may be constructed from a thinner material than the main locking disks 44, for reasons to be hereinafter explained.

As shown by FIG. 5, each upper locking disk 44 includes three wings 66 equally spaced about the locking disk 44. Each wing 66 forms a dihedral with a flat central portion 68. Fold lines 69 give the central portion 68 a generally triangular shape. The outer edges 70 of the wings 44 may be plain or serrated. The plain form is illustrated.

As shown by FIG. 5, the edges 70 lie on circles having their center at the center 72 of opening 56. The circle on which the edges 70 lie is either substantially equal to or slightly less in diameter than the inside diameter of the tubular end portion 26 of member 14, so that the main lock discs will not interfere with easy insertion of the connector assembly into the socket 26. Easy insertion is the key factor. The lower locking disk 44' is essentially identical to the upper locking disk 44 except that the winged portions 66 are bent upwardly.

The connector assembly is assembled as follows. The stud 28 is connected to the member 22, such as by making stud 28 in the form of a bolt. The washer 39 is then installed onto the stud 28. A lower locking disk 44' is placed onto the stud 28 with winged portions 66' directed upwardly. The cam ring 36 is placed on the stud 28 above the lower locking disk 44'. Next the upper locking disk(s) 44 is placed onto the stud 28 with wings 66 extending downwardly toward the cam 36. Next, the nut 46 (with nut wing washer 50 attached) is installed and is screwed down until it contacts the upper locking disc 44 (or the top upper locking disk 44 in a stack).

After the elements 39, 44', 36, 44, 46, and 50 are installed onto the stud 28, the upper or free end of the stud 28 may be spread or otherwise deformed, as shown by FIGS. 4 and 7, for the purpose of preventing removal of the nut 46 from the stud 28. This particular technique is per se old.

When the parts are assembled, the lower locking disk 44' is in contact with the lower beveled surface 40' and lowermost upper locking disk 44 is in contact with the upper beveled surface 40 of cam member 36. The cam member 36 includes a bevel 40, 40' at each of its opposite ends. The beveled surfaces 40, 40' are of the same size so that it makes no difference in which direction the cam member 36 is installed onto the stud 28. The second upper locking washer 44 is down in contact with the first upper locking washer 44 and the third upper locking disk 44 is down in contact with the second main locking disk 44. The nut 46 is down against the upper main locking disk 44. The nut wing washer 50 is down on the lower flange portion 48 of the nut 46. The flattened or spread portion 29 of stud 28 extends down to the top of nut 46, so that there is no possibility of nut 46 becoming loose. The contact between the elements is important so that any rotation of member 22 relative to member 14 will act to create a straightening force on the wings of the lock disks 44, 44'.

After the connector assembly 24 is on the stud 28, such assembly 24 is aligned with the open end of tubular portion 26 of support leg member 14, and then member 22 is moved upwardly, to force the connector assembly 24 into the interior of end portion 26. This is shown in FIG. 7.

As stated above, the nut wing washer 50 is constructed to have the wings 58 lie on a circle that is larger in diameter than the inner diameter of tubular portion 26. Accordingly, in order for the nut wing washer 50 to enter into the interior of tubular portion 26, the wings 58 must bend downwardly some from their original position. The nut wing washer 50 is constructed from a sheet metal of suitable thickness to allow this bending to easily occur, but at the same time have enough stiffness in the wings 58 that once the nut wing washer 50 is inside of tubular portion 26, the wings 58 will grip the cylindrical wall of portion 26 a sufficient amount to hold the nut 46 against rotation during rotation of member 22.

As previously described, the edges 70, 70' of the locking disks 44 lie on a circle that is of such a dimension that the locking disks can be easily moved endwise into the tubular portion 26. However, at the same time, the edges 70, 70' are either already in contact with the inner surface of tubular member 26, or are at least closely adjacent to the inner surface of tubular portion 26.

Washer 39 performs two functions. It is preferably constructed from stainless steel so that it will be an electrolytic barrier between member 14 and member 22. This would allow construction of member 14 from one metal (e.g. aluminum) and member 22 from a second metal (e.g. soft steel). Washer 39 also functions as a bearing between the support leg 14 and the member 22. The washer 39 may be provided with a suitable coating which is corrosion resistant and preferably also reduces friction.

As already described, the cam surfaces 40, 40' make contact with the lowermost upper locking disk 44 and lower locking disk 44', and during relative rotation of member 22 and stud 28 relative to tube 14 and nut 46, exert a straightening force on the wing portions 66, 66' of the locking disks 44, 44'.

After the connector assembly is within the tubular portion 26 the member 22 is rotated. The nut wing washer 50 holds nut 46 against rotation and so there is an axial movement of the nut 46 along the stud 28. When the member 22 is rotated in the clockwise direction the nut 46 travels relatively along the stud 28 toward the member 22. This causes a squeezing of the lock disks 44, 44' between the nut 44 and the member 22 with the cam ring 36 therebetween. The edge 40, 40' of cam ring 36 impose an axial force on the wings 66, 66' causing them to swing outwardly. As bending of the wings 66 occurs, the edge diameter of disks 44, 44' increases and the edges 70 are moved into a "biting" displacement with the inner wall of tubular portion 26. The member 22 is rotated until further rotation is very difficult and the member 22 is properly oriented relative to the desired position of the member that is going to be attached to it. At this time the edges of washer 50 and the edges 70 of the locking disks 44, 44' have been moved into the wall material of tubular portion 26 an amount sufficient that the member 22 is securely connected to support leg 14 and will remain connected when subjected to forces which exceed the forces that the members 14, 22 are designed to encounter.

The lower locking disk 44' performs two functions. Because in the preferred embodiment there are three stacked upper locking disks 44 and only one lower locking disk 44', wing portions 66' of the lower locking disk 44' will straighten and engage the sidewall of tubular portion 26 prior to engagement of the upper locking disks 44 when the locking disks 44, 44' are compressed against the cam ring 36. In this manner, the cam ring 36 is supported by the lower locking disk 44' against downward movement as the nut 46 presses the upper locking disks 44 downwardly thereto. Without such support, downward movement of the nut 46, and thereby the central portions 68 of the upper locking disks 44, could cause downward movement of the cam ring 36 against the member 22. A separation or gap between the support leg 14 and member 22 could allow play in the connection therebetween, compromising the integrity of the connection. If downward displacement of the cam ring 36 causes downward displacement of the member 22, thereby allowing a gap between the member 22 and the support leg 14, lateral shock loads placed on the member 22 would cause the stud 28 to act as a cantilever supported only at a point upward from the lower edge 71 of the support leg 14.

The lower locking disk 44' functions to eliminate both of these problems. First, it supports the cam ring 36 to prevent the downward displacement of member 22 from the lower edge 71 of the support leg 14 as the connector assembly 24 is being expanded. Second, the lower locking disk 44' provides a second point of engagement spaced from the upper point of engagement of the upper locking disk 44, thereby preventing the stud 28 from acting as a cantilever when lateral shock loads are placed on the member 22.

The hanger assembly shown by FIG. 1 is especially adapted for use in connecting lighting fixtures to ceilings in naval ships. At the present time, there are hanger structures in existence which include a vertical support leg that is welded at its upper end to a ceiling structure, and is welded at its lower end to a support bar. If it ever becomes necessary to remove the structure, it becomes necessary to cut the welds or the members.

The support structure shown by FIG. 1 can be usually secured to and removed from a ceiling structure. If after the assembly has been installed, in the manner described above, it becomes necessary to remove the hanger structure for some reason, this can be easily done without damage. The light fixture or whatever other structure is secured to the member 22 is first removed. Then, the support leg 14 is rotated in the screw loosening direction, for unscrewing the threaded joint at the upper end of member 14. The hanger 14, 22 can be easily reattached by again screwing the leg member 14 to the ceiling stud 12. When the joint is tightened, the member 22 will be substantially back to its proper position. A wrench can be applied to the flats 15, 17 and used for turning the leg 14 relative to the stud 12.

The expansion mechanism of this invention does not involve a mere "friction" fit. The edges of the wings actually penetrate into the socket wall material. There is a galling action. The wings deform and displace the wall material and dig progressively further into the socket wall as the withdraw force is increased. Under actual test, there was zero creep at 10,000 lbs. of load acting to withdraw the insert from the socket. A friction type expansion anchor would experience creep at a load of about 400 lbs. or less.

The joint construction formed between member 22 and the lower end of support leg 14 has utility in other installations in addition to the installation illustrated by FIG. 1. Member 22 can be any member, and can itself be a tubular member. The tubular portion 26 may be an end piece, or a socket portion of a nontubular member.

In preferred form, the upper end of support leg 14 is provided with a bracing preload member 80, shown to be conical in form. Member 80 includes a small end 82, a large end 84 and a sidewall 86 disposed between the ends 82, 84. The small end defines a central opening 88 in which the leg 14 is received. Member 80 may be connected to leg 14 by a weld bead 90. Preferably, the weld line 90 is located radially outwardly of the insert 16. The upper end 84 of member 80 defines a circular edge that makes contact with member 10. Edge or end 84 projects axially upwardly beyond the upper end of member 14 so that when contact is first made between edge 84 and member 10 there is clearance or a gap between the upper end of leg 14 and member 10. The upper end of stud 12 is welded to member 10 and a fillet 92 surrounds the base of stud 12. The upper end of leg 14 makes contact with this fillet 92 during tightening rotation of the leg 14. Galling occurs so that a tight contact is made where the leg metal contacts the weld metal. A tight fit is created which resists sideways movement of the upper end of leg 14 about the connection 90 in response to a sideways load on a lower portion of the leg 14. The cone 80 is put into compression and this preloads the joint. In use, the preload absorbs vibration forces imposed on the joint. This joint construction is the subject matter of my U.S. Pat. No. 4,735,390, issued Apr. 5, 1988, and entitled "Support Leg Joint Construction With Bracing."

In accordance with the established law of patent interpretation, the embodiment that has been illustrated and described has been submitted by way of an example only. The scope of protection provided by the patent is to be determined by the terms of the following claims, and by the doctrine of equivalents.

What is claimed is:

1. A joint construction, comprising:
   a first member including a cylindrical sidewall defining a socket having an inner surface; a second member;
   a connector assembly on said second member, said connector assembly comprising:
   a threaded stud projecting from said second member having a base and a free end;
   a lower locking disk having a center opening through which the stud extends and a plurality of edged wings spaced around the disk and bent to extend away from the base of the stud, said lower locking disk having a plan form sized to allow the locking disk to slip fit into said socket;
   a cam ring having a center opening through which the stud extends and having upper and lower beveled edges spaced radially outwardly from said stud at opposite ends, said cam ring being smaller in diameter than the inside diameter of said socket;
   at least one upper locking disk having a center opening through which the stud extends, and a plurality of edged wings spaced around the disk and bent to extend toward the upper beveled edge of the cam ring, said at least one upper locking disk having a plan form sized to slip fit into said socket;
   a nut threaded onto the stud axially outwardly of the at least one upper locking disk;
   a nut wing washer on said nut and secured against rotation relative to the nut, said nut wing washer having a plurality of wings bent to extend toward the cam ring, and having a plan form that is larger than the inside diameter of said socket,
   means for holding the nut wing washer against axial movement off of the nut; and
   wherein the first and second members are connected together by an insertion movement of the connector assembly on the second member into the socket of the first member, such movement causing a bending of the wings of the nut wing washer, attended by outer edges of such wings gripping the inner surface of the socket and holding the nut wing washer against rotation, followed by a rotation of the second member relative to the first member, with the nut wing washer holding the nut in position relative to the first member during such rotation, causing relative axial travel of the nut on the stud toward the cam ring, and with such axial travel causing the beveled edges of the cam ring to push the wings of the upper and lower locking disks outwardly, so as to press their edges into tight gripping engagement with the inner surface of the socket.

2. A joint construction according to claim 1, comprising a plurality of upper locking disks of the character described, positioned on the stud between the nut and the cam ring.

3. A joint construction according to claim 1, wherein the nut includes a flange at its end nearest the cam ring, and said nut wing washer fits down on said flange.

4. A joint construction according to claim 1, wherein the threaded stud is a shank portion of a bolt, and said second member includes an opening through which the shank of the bolt extends, and said bolt has a head which bears against a side of the member that is opposite the first member.

5. A joint construction according to claim 4, wherein said bolt shank includes a nonround shoulder portion, and said second member's opening is shaped to closely receive said shoulder portion such that said bolt is secured against rotational movement relative to the second member.

6. A joint construction according to claim 5, wherein said connector assembly further comprises a washer member having a center opening through which the stud extends, said washer being between said second member and said lower locking disk and being sized to exceed the inside diameter of said socket such that said washer member is sandwiched between said first and second members.

7. A joint construction according to claim 1, wherein said stud includes means at its free end for preventing removal of the nut from the rod.

8. A mounting structure for a suspended object, comprising:
a support leg member having a lower end socket defined by a cylindrical sidewall having an inner surface;
a frame member including a connector assembly, said connector assembly comprising:
a threaded stud projecting from said frame member and having a base and a free end;
a lower locking disk having a center opening through which the stud extends and a plurality of edged wings spaced around the disk and bent to extend away from the frame member, said locking disk having a plan form sized to allow the locking disk to slip fit into said socket;
a cam ring having a center opening through which the stud extends, said cam ring being smaller in diameter than the inside diameter of said socket, said cam ring including upper and lower beveled edges at opposite ends;
at least one upper locking disk having a center opening through which the stud extends, and a plurality of edged wings spaced around the disk and bent to extend toward the upper beveled edge of the cam ring, said at least one upper locking disk having a plan form sized to allow the locking disk to slip fit into said socket;
a nut threaded onto the stud axially outwardly of the at least one upper locking disk;
a nut wing washer on said nut and secured against rotation relative to the nut, said nut wing washer having a plurality of wings bent to extend toward the cam member, and having a plan form which is larger than the inner diameter of the socket;
means for holding the nut wing washer against axial movement off of the nut; and
wherein the frame member is connected to the support leg member by an insertion movement of the connector assembly on the frame member into the lower end socket of the support leg member, such movement causing bending of the wings of the nut wing washer, attended by edges of such wings gripping the inner surface of the lower end socket of the support leg member, and holding the nut wing washer against rotation, followed by the rotation of the frame member relative to the support leg member, with the nut wing washer holding the nut in position relative to the support leg member during such rotation, causing relative axial travel of the nut on the stud toward the cam ring, and with such axial travel causing the beveled edges of the cam ring to push the wings of the upper and lower locking disks outwardly, so as to press their edges into tight gripping engagement with the inner surface of the lower end socket of the support leg member.

9. A mounting structure according to claim 8, comprising a plurality of upper locking disks of the character described, positioned on the stud between the nut and the cam member.

10. A mounting structure according to claim 8, wherein the nut includes a flange at its end nearest the cam ring, and said nut wing washer fits down on said flange.

11. A mounting structure according to claim 8, wherein the threaded stud is a shank portion of a bolt, and said frame member includes an opening through which the shank of the bolt extends, and said bolt has a head which bears against a side of the member that is opposite the first member.

12. A mounting structure according to claim 11, wherein said bolt shank includes a nonround shoulder portion, and said frame member's opening is shaped to closely receive said shoulder portion such that said bolt is secured against rotational movement relative to the second member.

13. A mounting structure according to claim 8, wherein said connector assembly further comprises a washer member having a center opening through which the stud extends, said washer being between said frame member and said lower locking disk and being sized to exceed the inside diameter of said socket such that said washer member is sandwiched between said frame member and said supporting member.

14. A mounting structure according to claim 8, wherein said stud includes means at its free end for preventing removal of the nut from the rod.

15. A joint construction, comprising:
a first member including a cylindrical sidewall defining a socket having an inner surface;
a threaded stud projecting from a second member, said stud having a base and a free end;
a lower locking disk having a center opening through which the stud extends and a plurality of edged wings spaced around the disk and bent to extend away from the base of the stud, said lower locking disk having a plan form sized to allow the locking disk to slip fit into said socket;
a cam ring having a center opening through which the stud extends and having upper and lower beveled edges spaced radially outwardly from said stud at opposite ends, said cam ring being smaller in diameter than the inside diameter of said socket;

an upper locking disk having a center opening through which the stud extends, and a plurality of edged wings spaced around the disk and bent to extend toward the upper beveled edge of the cam ring, said upper locking disk having a plan form sized to slip fit into said socket; and a nut threaded onto the stud axially outwardly of the at least one upper locking disk;

wherein the first and second members are connected together by an insertion movement of the free end of the stud into the socket of the first member, and rotation of the nut to cause axial compression of the lower locking disk, the cam ring, and the upper locking disk between the nut and the second member, such axial travel causing the beveled edges of the cam ring to push the wings of the upper and lower locking disks outwardly, so as to press the edges of said locking disks into tight gripping engagement with the inner surface of the socket.

16. A joint construction according to claim 15, comprising a plurality of upper locking disks of the character described, positioned on the stud between the nut and cam ring.

* * * * *